US011345105B2

(12) United States Patent
Dai et al.

(10) Patent No.: US 11,345,105 B2
(45) Date of Patent: May 31, 2022

(54) TIRE FORMING METHOD

(71) Applicants: Eve Rubber Institute Co., Ltd, Shandong (CN); Mesnac Co., Ltd., Shandong (CN)

(72) Inventors: Deying Dai, Shandong (CN); Qingyong Bu, Shandong (CN); Zhao Sun, Shandong (CN); Suxia Tian, Shandong (CN); Dan Qin, Shandong (CN)

(73) Assignees: Eve Rubber Institute Co., Ltd.; Mesnac Co., Ltd.

( * ) Notice: Subject to any disclaimer, the term of this patent is extended or adjusted under 35 U.S.C. 154(b) by 593 days.

(21) Appl. No.: 16/304,039

(22) PCT Filed: May 19, 2017

(86) PCT No.: PCT/CN2017/085155
§ 371 (c)(1),
(2) Date: Nov. 21, 2018

(87) PCT Pub. No.: WO2017/202259
PCT Pub. Date: Nov. 30, 2017

(65) Prior Publication Data
US 2020/0316890 A1    Oct. 8, 2020

(30) Foreign Application Priority Data
May 23, 2016   (CN) .......................... 201610347965.7

(51) Int. Cl.
*B29D 30/26*   (2006.01)
*B29D 30/20*   (2006.01)
(52) U.S. Cl.
CPC ........ *B29D 30/26* (2013.01); *B29D 2030/206* (2013.01); *B29D 2030/2614* (2013.01)

(58) Field of Classification Search
CPC ........ B29D 30/08; B29D 30/14; B29D 30/16; B29D 30/18; B29D 30/244; B29D 30/246;
(Continued)

(56) References Cited

U.S. PATENT DOCUMENTS 4,584,038 A * 4/1986 Enders ................. B29D 30/32
156/132
5,087,316 A * 2/1992 Sumiuchi ........... B29D 30/2607
156/126
(Continued)

FOREIGN PATENT DOCUMENTS

| CN | 101372155 A | 2/2009 |
| CN | 105818407 A | 8/2016 |
| CN | 105965926 A | 9/2016 |

OTHER PUBLICATIONS

Cheng et al., CN-101372155-A, updated machine translation. (Year: 2009).*

*Primary Examiner* — Robert C Dye
*Assistant Examiner* — Sedef E Paquette
(74) *Attorney, Agent, or Firm* — Fishman Stewart PLLC

(57) ABSTRACT

A tire building method comprises the following steps: step 1, manufacturing a first carcass assembly on a carcass drum, and transferring the first carcass assembly to a building drum through a first carcass transfer device; step 2, manufacturing a second carcass assembly on a belt drum, and transferring the second carcass assembly to the building drum through a second carcass transfer device; step 3, respectively driving a first chuck seat and a second chuck seat to move oppositely by a first nut and a second nut; step 4, sleeving the second carcass assembly on the supported first carcass assembly, and fitting the two carcass assemblies together and rolling the same to form a third carcass assembly; step 5, winding a tread to the outer surface of the third carcass assembly to
(Continued)

form a fourth carcass assembly; and step 6, dismounting the fourth carcass assembly from the building drum.

7 Claims, 5 Drawing Sheets

(58) Field of Classification Search
CPC .. B29D 30/248; B29D 30/26; B29D 30/2607; B29D 30/32; B29D 2030/086; B29D 2030/088; B29D 2030/206; B29D 2030/2614; B29D 2030/26354; B29D 2030/2664; B29D 2030/3207; B29D 2030/3214; B29D 2030/3221; B29D 2030/3228; B29D 2030/3235; B29D 2030/3242; B29D 2030/325; B29D 2030/3257; B29D 2030/3264; B29D 2030/3278

USPC .... 156/131, 132, 133, 135, 394.1, 398, 400, 156/401, 402, 403
See application file for complete search history.

(56) References Cited

U.S. PATENT DOCUMENTS

| | | | | |
|---|---|---|---|---|
| 5,120,390 | A * | 6/1992 | Klose | B29D 30/32 156/398 |
| 5,354,404 | A * | 10/1994 | Benjamin | B29D 30/005 156/123 |
| 6,416,305 | B1 * | 7/2002 | Singh | B29D 30/0645 425/29 |
| 6,585,022 | B1 * | 7/2003 | Rex | B29D 30/246 156/401 |
| 2007/0267125 | A1 * | 11/2007 | Mancini | B29D 30/10 156/126 |
| 2010/0000662 | A1 * | 1/2010 | Onimatsu | B29D 30/247 156/132 |

* cited by examiner

TIRE FORMING METHOD

CROSS-REFERENCE TO RELATED APPLICATIONS

This application claims priority to China Patent Application Nos. CN 201610347965.7 filed May 23, 2016, and International Patent Application No. PCT/CN2017/085155 filed May 19, 2017, all of which are hereby incorporated by reference in their entirety.

FIELD OF THE DISCLOSURE

The present disclosure relates to the field of tire building, and in particular to a three-drum tire building method.

BACKGROUND OF THE DISCLOSURE

A tire building process is not carried out on one building device. Instead, different carcass assemblies are separately produced on different drums, then the carcass assemblies formed in the first procedure are all transported to the last drum, and a final product is manufactured. In these processes, two-drum, three-drum and four-drum building machines and methods thereof are generally employed. The difference in the manufacturing equipment determines the difference in the production process of the carcass.

First, how to arrange each production device on a production line will directly determine the production efficiency and the cost of the plant.

Second, there is an important step in the tire building process, which involves turn-down and turn-up processes of a carcass material. Especially in the turn-up process, the turn-up is performed by using a bladder in the majority of processes, but the traditional bladder cannot be rotated together with a building drum, the carcass material is worn by the friction with the bladder in the building process, and the component structural ratio of the bladder is not good, resulting in serious wear of the turn-up bladder in the turn-up process of the tire, and causing a larger pressure on the control of the production cost.

Third, after the turn-down process, bead setting should be performed on an apex bead ring before the turn-up process, in the traditional bead setting process, as the bead setting structure is too simple, the apex bead ring is not firmly bonded, and bead setting members are also severely worn.

Fourth, due to the improper manufacturing process and improper material selection of a building machine main shaft and the main shaft of a turn-up device, the main shafts are prone to premature wear and damage, such that the production cost is increased.

Fifth, in the multi-drum building device and building method, a step of transporting a green tire from one drum to another drum is involved. The building step of a carcass is involved on each drum, every step of these procedures is carried out in sequence and is not omittable. Therefore, how to efficiently transport the green tire from one drum to another drum directly determines the efficiency of tire building. At the same time, the transfer locating accuracy of the carcass assembly also affects the quality of the tire building.

In view of this, the present disclosure is proposed. An objective of the present disclosure is to design a tire building device which rationally arranges a production line, reduces the length of the production line as much as possible, reduces the construction cost of the factory, reduces the wear of a turn-up bladder, reduces the wear of a bead setting component, ensures firm bonding of apex, reduces the wear of a main shaft, improves the production efficiency and reduces the production cost.

SUMMARY OF THE DISCLOSURE

In order to solve the above technical problems, the present disclosure provides a tire building method, comprising the following steps:

step 1, manufacturing a first carcass assembly on a carcass drum, and transferring the first carcass assembly to a building drum through a first carcass transfer device;

step 2, manufacturing a second carcass assembly on a belt drum, and transferring the second carcass assembly to the building drum through a second carcass transfer device;

step 3, respectively driving a first chuck seat and a second chuck seat to move oppositely by a first nut and a second nut, and meanwhile inflating a building bladder on the building drum to support the first carcass assembly;

step 4, sleeving the second carcass assembly on the supported first carcass assembly, and fitting the two carcass assemblies together and rolling the same to form a third carcass assembly;

step 5, fitting or winding a tread to the outer surface of the third carcass assembly to form a fourth carcass assembly; and step 6, dismounting the fourth carcass assembly from the building drum, thus completing the tire building operation.

The method of manufacturing the first carcass assembly on the carcass drum may comprise one or more of the following steps:

step 1-1: sleeving the carcass assembly on the carcass drum;

step 1-2: respectively performing turn-down on the two sides of the carcass assembly by using a first turn-up device and a second turn-up device;

step 1-3: respectively performing bead setting on the two sides of the carcass assembly by using the first turn-up device and the second turn-up device;

step 1-4: respectively performing bead locking on the two sides of the carcass assembly by using the first turn-up device and the second turn-up device;

step 1-5: respectively performing turn-up on the two sides of the carcass assembly by using the first turn-up device and the second turn-up device; and step 1-6: completing all turn-up processes of the carcass assembly to obtain the first carcass assembly.

The specific steps of transferring the first carcass assembly to the building drum through the first carcass transfer device may be as follows:

Step 2-1, preparation: the entire first carcass transfer device is at a waiting position, and the turn-up device faces to the carcass drum; an oil cylinder on a supporting device retracts back to retract a roller and to leave a balance seat; and then, a rotating device rotates, so that a transfer ring device faces to the carcass drum;

step 2-2, clamping: the oil cylinder on the supporting device extends out, so that the roller is supported on the balance seat, and the first carcass transfer device moves toward the carcass drum; when the first carcass assembly is located in the transfer ring device, the first carcass transfer device stops moving; and then, the transfer ring device clamps the first carcass assembly located on the carcass drum;

step 2-3, transfer: the first carcass transfer device moves toward the building drum, and after the transfer ring device leaves the carcass drum, the oil cylinder on the supporting device retracts back to take back the roller and to cause the roller to leave the balance seat; and then, the rotating device rotates 180 degrees, so that the turn-up device faces to the carcass drum; and the oil cylinder on the supporting device extends out, so that the roller is supported on the balance seat, and the first carcass transfer device moves toward the building drum;

step 2-4, release: after the transfer ring device sleeves the first carcass assembly on the building drum, the first carcass transfer device stops moving; and then, the transfer ring device releases the green tire and sleeves the first carcass assembly on the building drum; and step 2-5, wait: the first carcass transfer device moves toward the carcass drum and moves to the waiting position.

The turn-down procedure in step 1-2 may comprise a step 2.1:

the turn-up device moves integrally along the axial direction of a building machine main shaft toward the carcass drum, and an outer sleeve device stops moving when the turn-up device arrives at a first distance away from the carcass drum; however, a ply down finger assy and a device thereon, and a bladder device and a device thereon continue to move along the axial direction of the building machine main shaft toward the carcass drum; at this time, a finger paddle on the ply down finger assy rotates along a hinge shaft, and the top thereof scatters; and the edge portion of the carcass assembly to be subjected to the turn-up procedure is just located on the inner side of the finger paddle.

The turn-down procedure in step 1-2 may comprise a step 2.2, which is executed after the step 2.1:

the outer sleeve device moves toward the carcass drum, and a auxiliary push sleeve on the outer sleeve device comes into contact with the finger paddle, so that the finger paddle rotates around the hinge shaft and tucks; and in the tucking process, the finger paddle abuts the edge portion of the carcass assembly against the bladder.

The bead setting step in step 1-3 may comprise the following:

an apex bead ring is arranged at an end of a clamping jaw of a bead setting device; a bead setting driving device pushes the clamping jaw, and the clamping jaw pushes the apex bead ring to the set position of the carcass assembly; and then, the clamping jaw returns to the original position under the drive of the bead setting driving device, thus completing the bead setting operation; and after the above step, the outer sleeve device and the ply down finger assy simultaneously move toward a direction away from the carcass drum for a distance.

The bead locking step in step 1-4 may comprise: a piston moves toward the carcass drum, then pushes a sliding disk toward the carcass drum along the axial direction, so that a mandril rises, and a locking block at the top of the mandril closely abuts the bladder against the carcass assembly.

The turn-up step in step 1-5 may comprise the bladder inflated to expand and extrude the carcass assembly upward toward the carcass drum, and at the same time, a auxiliary push disk pushes the expanded bladder to the carcass drum so as to turn up the carcass assembly to the outer side of the apex bead ring, thus completing the turn-up process.

The tire building method in the present disclosure is reasonable in design, novel in structure and reliable in working performance, and has the following advantages compared with prior technologies:

1. The turn-up bladder can rotate together with the carcass drum, which facilitates their fitting, and meanwhile, no wrinkle is generated during the turn-up, so that the building quality at the bead opening is improved.

2. Due to the special hierarchical structure and the component selection of the bladder, the air resistance and the air permeability of the bladder are improved, the adhesion performance between the layers of the bladder is improved, and the service life and toughness of the bladder are improved.

3. In the bead setting process, the bead setting portion is in close fit with the apex bead ring, and finally, there is no axial or radial offset of the bead ring after the bead setting device is removed, so that the building quality of the tire is improved.

4. For the building main shaft, the special component selection of the building process improves the hardness and the strength of the building main shaft and prolongs the service life of the equipment.

5. The distances among the three transfer rings are adjusted to meet the requirements for clamping tires of different specifications.

6. A roller supporting structure is arranged on the supporting device to ensure the height of the transfer ring device and ensure the degree of overlap of the transfer ring center and the building drum center, thereby ensuring the transfer precision of the carcass.

7. By adjusting the length of a limiting device on the supporting device, the height range of the supporting device when it is lifted and lowered can be adjusted, and the applicable range of the equipment is improved.

8. By mounting a gear and rack plate structure on the driving device, the whole tire building device can move along a straight line, thus ensuring that the tire building device is aligned with the building drum and the carcass drum, and ensuring that the transfer ring device can be accurately sleeved on the building drum and the carcass drum.

9. Since the first carcass transport equipment can rotate, the length of the entire production line is shortened, thereby reducing the length of the plant and reducing the construction cost of the plant.

10. The width of the carcass drum is adjustable to adapt to tire components with different widths, thus increasing the availability and adaptability of the equipment.

DETAILED DESCRIPTION OF THE EMBODIMENTS

Figure 1:
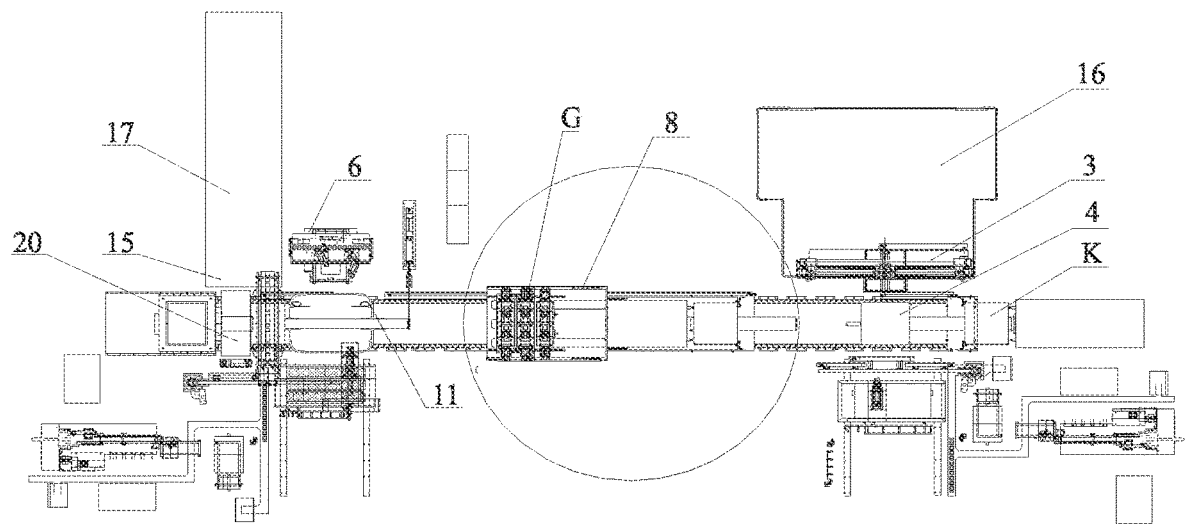
FIG. 1 is a schematic diagram of an overall structure of a tire building machine in the present disclosure.
Figure 2:
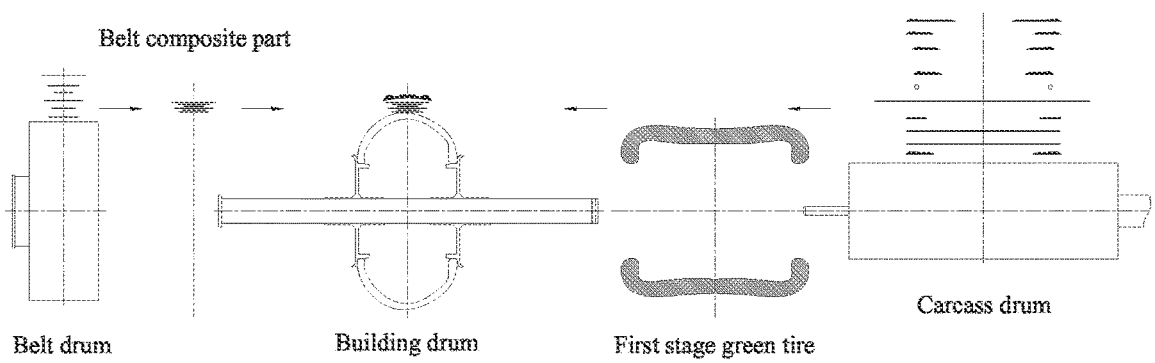
FIG. 2 is a schematic diagram of relative positions of a belt drum, a building drum and a carcass drum.
Figure 3:
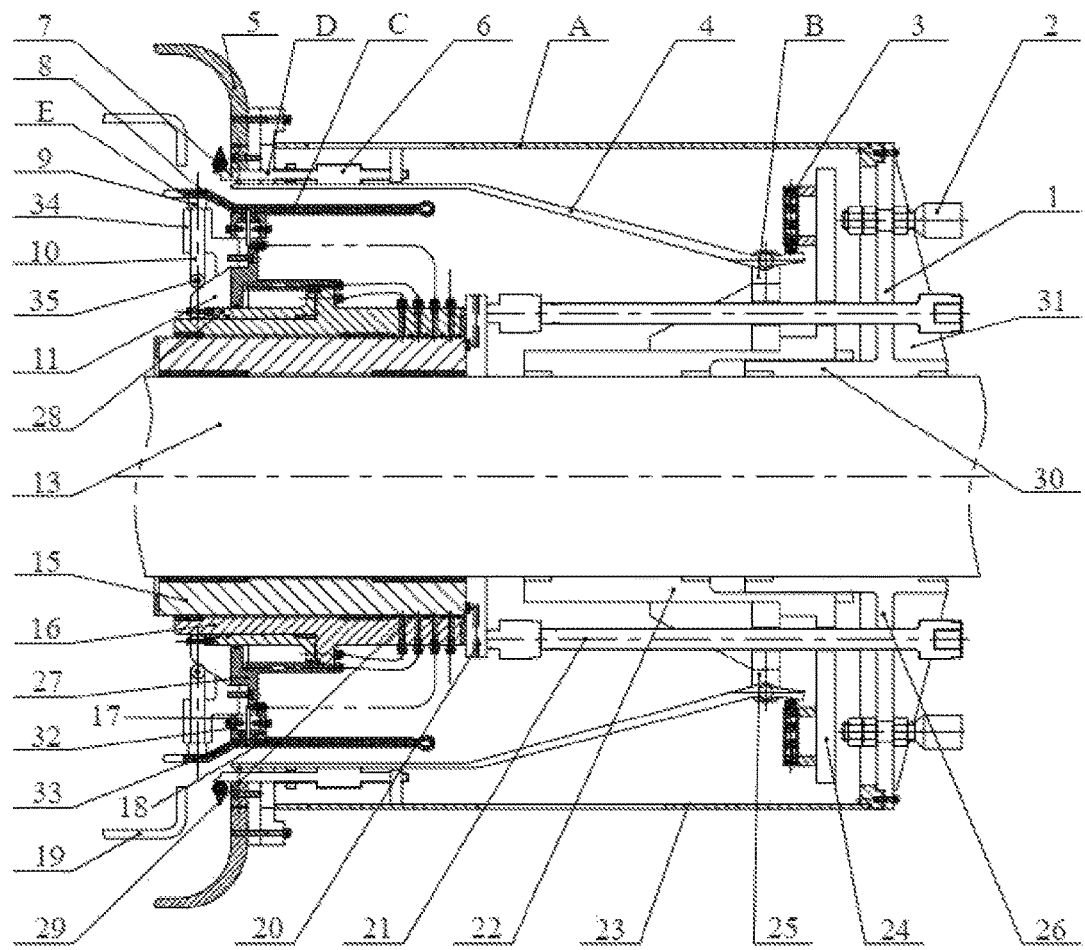
FIG. 3 is a structural schematic diagram of a turn-up device in the present disclosure.
Figure 4:
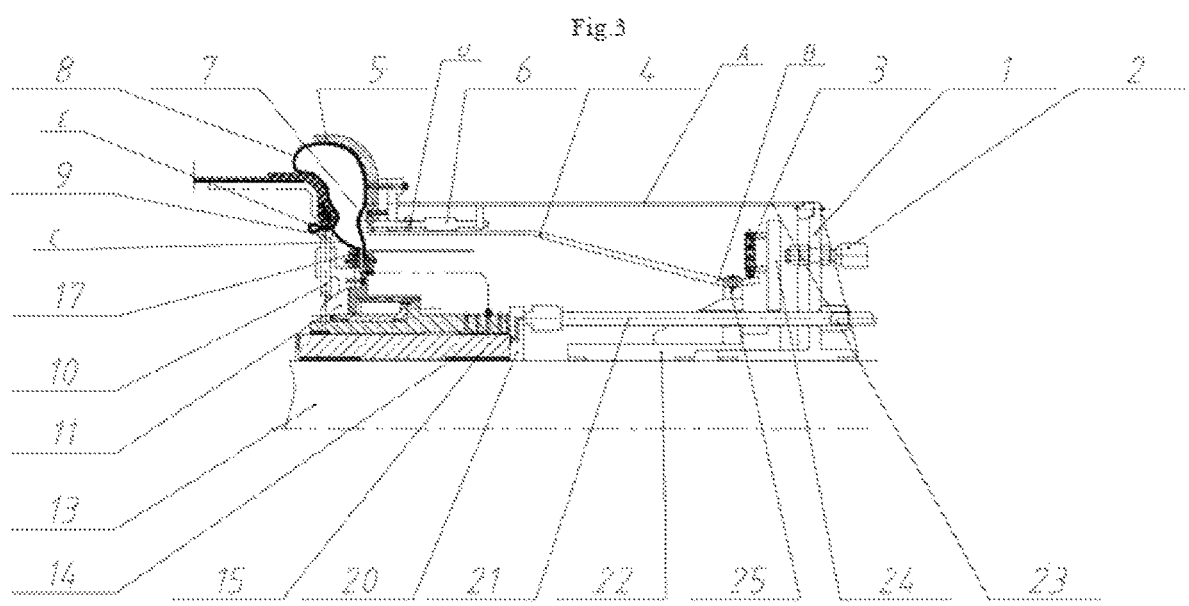
FIG. 4 show an inflated state of a bladder when the turn-up device in the present disclosure performs the turn-up process.
Figure 5:
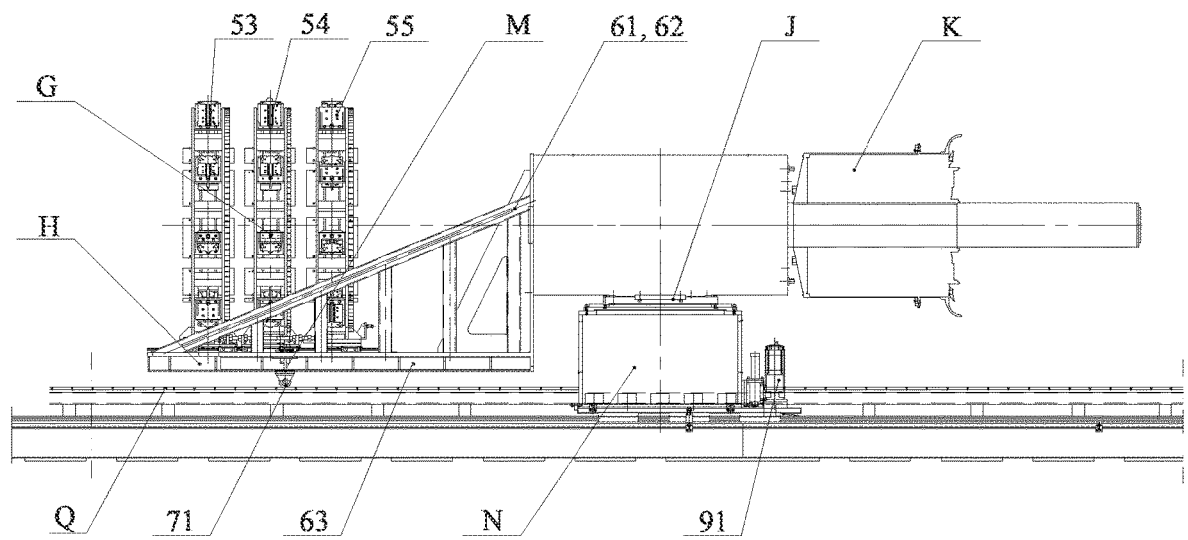
FIG. 5 is a structural schematic diagram of a first carcass transfer device in the present disclosure.
Figure 6:
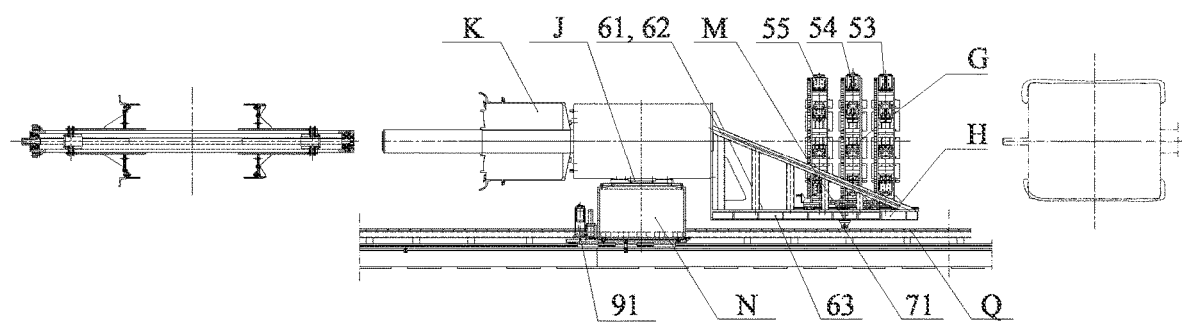
FIG. 6 is a state when the first carcass transfer device in the present disclosure is moving toward the building drum.

The present disclosure is further described below in combination with drawings.

I. Tire Building Machine

1. Overall Structure

A tire building machine comprises a carcass drum, a belt drum and a building drum, wherein the tire building machine may further comprise:

a first carcass transfer device located between the carcass drum and the building drum and used for transferring a first carcass assembly between the carcass drum and the building drum; the first carcass transfer device is rotatable and comprises a turn-up device;

a second carcass transfer device located between the building drum and the belt drum and used for transferring a second carcass assembly between the building drum and the belt drum; and the belt drum, the second carcass transfer device, the building drum, the first carcass transfer device and the carcass drum are successively arranged on the same axis.

2. First Carcass Feeding Device

The first carcass feeding device and a first rolling device are arranged on a radial side of the carcass drum.

3. Second Carcass Feeding Device

The second carcass feeding device and a second rolling device are arranged on a radial side of the belt drum.

II. Overall Working Method of the Tire Building Machine

Step 1, manufacturing a first carcass assembly on the carcass drum, and transferring the first carcass assembly to the building drum through the first carcass transfer device;

step 2, manufacturing a second carcass assembly on the belt drum, and transferring the second carcass assembly to the building drum through the second carcass transfer device;

step 3, on the building drum, respectively driving a first chuck seat and a second chuck seat to move oppositely by a first nut and a second nut until arriving at set positions, and meanwhile inflating a building bladder to support the first carcass assembly;

step 4, sleeving the second carcass assembly on the supported first carcass assembly, and fitting the two carcass assemblies together and rolling the same to form a third carcass assembly;

step 5, processing the third carcass assembly to form a fourth carcass assembly; and step 6, dismounting the fourth carcass assembly from the building drum, thus completing the tire building operation.

III. The First Carcass Transfer Device

1. The Overall Structure of the First Carcass Transfer Device

The first carcass transfer device comprises a transfer ring device G, a supporting device H, a rotating device J, a turn-up device K, a balancing device M and a base device N; the rotating device J is mounted above the base device N, the turn-up device K is mounted on one side of the rotating device J, and the supporting device H is mounted on the other side of the rotating device J; the transfer ring device G is mounted on the supporting device H; and the transfer ring device G, the supporting device H, the rotating device J and the turn-up device K can rotate together; the balancing device M is mounted on the supporting device H; and a balance seat Q is mounted on the base device N, and the balancing device M is supported on the balance seat Q in a separable manner.

2. The Transfer Ring Device G

The transfer ring device G comprises a first transfer ring 53, a second transfer ring 54 and a third transfer ring 55; and the first transfer ring 53, the second transfer ring 54 and the third transfer ring 55 are successively mounted on a transfer ring bracket bottom plate 63. In the present disclosure, three transfer rings are used for respectively clamping the two ends and the middle of the carcass, so that the carcass does not deform when the carcass is clamped. Meanwhile, compared with the manual transfer mode, the carcass can be accurately located.

A position adjustment device is mounted between each transfer ring, and the position adjustment device is a lead screw structure that can adjust the distances among the three transfer rings to meet the requirements of clamping tire with different size specifications.

3. The Supporting Device H

The supporting device H comprises: a first transfer ring bracket 61, a second transfer ring bracket 62, and the transfer ring bracket bottom plate 63; one side of the first transfer ring bracket 61 and one side of the second transfer ring bracket 62 are mounted on the rotating device J; and the bottoms of the first transfer ring bracket 61 and the second transfer ring bracket 62 are connected with the transfer ring bracket bottom plate 63.

4. The Balancing Device M

The balancing device M is mounted on the transfer ring bracket bottom plate 63, and comprises: a roller 71, a roller seat 72 and an oil cylinder 73; the roller 71 is mounted on the roller seat 72, the roller seat 72 is mounted on the oil cylinder 73 through a guiding shaft 74, and the oil cylinder 73 is mounted on the transfer ring bracket bottom plate 63.

After the transfer ring device G clamps a green tire, and as the carcass is very heavy, the supporting device H inevitably sags under the effect of gravity. At this time, the piston rod of the oil cylinder 73 on the balancing device extends out, so that the roller 71 connected thereto is supported on the balance seat Q; the first transfer ring 53, the second transfer ring 54 and the third transfer ring 55 are lifted to necessary heights, which ensures that the centers of the three transfer rings overlaps with the center of the building drum in the next procedure, thereby ensuring the transfer precision of the carcass.

Figure 7A:
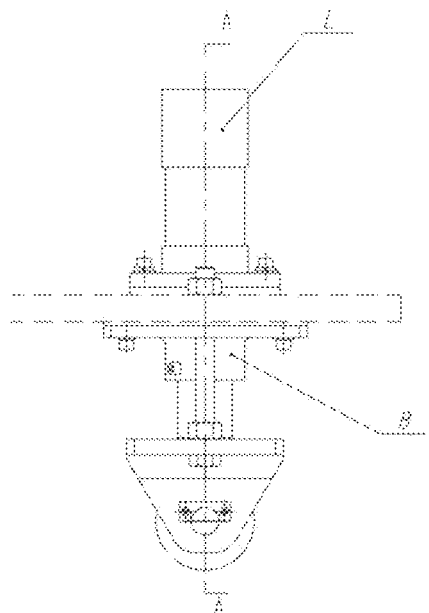
FIG. 7A is a structural schematic diagram of a second supporting device in the first carcass transfer device in the present disclosure.
Figure 7B:
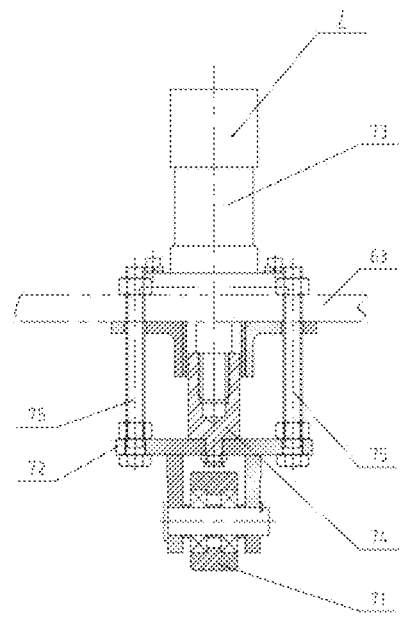
FIG. 7B is a diagram taken from section cut A-A of FIG. 7A.

5. Limiting Device L—FIGS. 7A and 7B

The first carcass transfer device further comprises a limiting device L, and the limiting device L comprises two limiting rods 75, which are respectively mounted on the two sides of the roller seat 72; one end of each limiting rod 75 is fixedly connected to the roller seat 72 through two nuts, wherein a first nut is located above the roller seat 72, and a second nut is located blew the roller seat 72. The other end of each limiting rod 75 is connected to the transfer ring bracket bottom plate 63 through a third nut, and the third nut is located above the transfer ring bracket bottom plate 63. By adjusting the position of the third nut, the length of the limiting rod located between the third nut and the second nut can be adjusted, so that the stroke of the oil cylinder 73 can be adjusted, and then the height ranges of the roller 71 when it is lifted and lowered can be adjusted.

6. Driving Device

The first carcass transfer device further comprises a driving device I, the driving device is mounted on the base device N, and the driving device I comprises: a servo motor 91, a gear 92, a rack 94, a base 96 and a guiding device 97.

The servo motor 91 drives the gear 92 to rotate, the gear 92 is engaged with the rack 94, the lower side of the guiding device 97 is sleeved on the base 96, and the upper side of the guiding device 97 is mounted on the base device N. A supporting roller 93 is further mounted on the base device N to drive the entire first carcass transfer device to move on a supporting guide rail 95.

Therefore, when the servo motor 91 drives the gear 92 to rotate, due to the guiding function of the gear 92, the rack 94, the base 96 and the guiding device 97, the supporting roller 93 linearly moves on the supporting guide rail 95 to ensure that the tire building device is aligned with the building drum and the carcass drum and to ensure that the transfer ring device G can be accurately sleeved on the building drum and/or the carcass drum.

7. Turn-Up Device K 7.1 Overall Structure of the Turn-Up Device K

The first carcass transfer device comprises a turn-up device K, the turn-up device K comprises: a building machine main shaft 13, an outer sleeve device A, a ply down finger assy B, a bladder device C and a bead setting device D. The outer sleeve device A, the ply down finger assy B and the bladder device C are all sleeved on the building machine main shaft 13, and the outer sleeve device A is located on the outer sides of the ply down finger assy B and the bladder device C along the radial direction of the building machine main shaft 13; and the bead setting device D is located on the outer sleeve device A.

7.2 the Outer Sleeve Device of the Turn-Up Device

The outer sleeve device A comprises: an outer sleeve frame body 1, a auxiliary push sleeve 23 and a auxiliary push disk 5; the outer sleeve frame body 1 comprises a sleeving portion 30 and a supporting portion 31; the sleeving portion 30 is sleeved on the building machine main shaft 13; the supporting portion 31 is arranged on the sleeving portion 30; a auxiliary push disk driving device 2 (oil cylinder) is mounted at the outside of the supporting portion 31; and one end of the auxiliary push sleeve 23 is mounted at the end of the supporting portion 31, and the auxiliary push disk 5 is mounted on the other end of the auxiliary push sleeve 23.

The auxiliary push disk 5 is of an arc-shaped structure which is adapted to the shape of the tire, and the auxiliary push disk 5 is pushed by the auxiliary push disk driving device 2 (oil cylinder) to push the expanded bladder 8 in a shape adapted to the shape of the tire to the tire component so as to closely fit the tire component on the carcass drum.

7.3 the Ply Down Finger Assy of the Turn-Up Device

The ply down finger assy B comprises a finger paddle mounting sleeve 22, and the finger paddle mounting sleeve 22 is sleeved on the building machine main shaft 13; a finger paddle mounting seat 25 and a finger paddle push disk 24 are arranged on the finger paddle mounting sleeve 22, and a finger paddle 4 is mounted on the finger paddle mounting seat 25 in a hinging manner; a spring 3 is mounted on the finger paddle push disk 24; one end of the spring 3 is connected with the finger paddle 4; the finger paddle push disk 24 is driven by a finger paddle driving device 26; and the finger paddle driving device 26 is connected to the finger paddle push disk 24 and penetrates through the supporting portion 31 of the outer sleeve device A.

7.4 the Bladder Device of the Turn-Up Device

The bladder device C comprises a sealing inner sleeve 15, a sealing outer sleeve 16 and a connecting piece 21; the sealing inner sleeve 15 is sleeved on the building machine main shaft 13, and the sealing outer sleeve 16 is sleeved at the outside of the sealing inner sleeve 15; a cylinder body 27 is sleeved on the sealing outer sleeve 16; a bladder seat 17 is mounted on the cylinder body 27; and a bladder 8 is mounted on the bladder seat 17.

The bladder device C further comprises: a first chuck 32, a second chuck 33 and a bracket 18; the first chuck 32 and the second chuck 33 seal and fix the bladder 8 on the bladder seat 17; and the bracket 18 is mounted on the second chuck 33.

The bladder 8 comprises an inner rubber layer, an inner ply layer, an outer ply layer and an outer rubber layer from the inside to the outside, and a silica gel layer is arranged at a position corresponding to a bead on the outer side of the bladder 8; the components of the outer rubber layer comprises: 70-90% by mass of styrene-isobutylene-styrene and 10-30% by mass of polyamide polymers, and the outer rubber layer is cooled at 10-100° C. for 100-260 seconds after being vulcanized; and the inner rubber layer comprises an inner rubber layer I and an inner rubber layer II, which are independent from each other and are both made of natural rubber, the two inner rubber layers have the same thickness, and the inner rubber layers are filled with carbon black.

In the conventional tire building device, the tire building bladder device is located on the building drum of the bladder drum building machine and is mainly used for perbuilding turn-up building of a green tire. The existing tire building bladder is made of a natural rubber compound. The isolation layer of the tire building bladder is generally made of ordinary natural rubber and the like, so that the isolation effect is not good, and the bead is liable to be adhered to the bladder during the turn-up building of the tire, such that the green tire is difficult to detach, the surface of the carcass is uneven, and the defective percentage of the green tire is high. Meanwhile, the portion of the bladder is damaged early due to the adhesion, thus reducing the use times of the bladder. However, the bladder in the present utility model comprises a multilayer structure. It solves the problems that the bead and the blade are liable to be adhered during the tire building, the surface of the bead is uneven, and the defective percentage is high; and the use frequency of the bladder is improved, and the labor efficiency is improved.

Carbon black is filled between the inner rubber layer I and the inner rubber layer II to improve the toughness and the strength of the bladder during inflation and to prolong the service life of the bladder.

Due to the special components of the outer rubber layer, the weight of the bladder is reduced, the air resistance and the air permeability of the bladder are improved, the adhesion performance with the other layers of the bladder is improved, and the service life and the toughness of the bladder are improved.

The outer rubber layer comprises about 70-90% by mass of styrene-isobutylene-styrene and about 10-30% by mass of polyamide polymers, and is cooled at about 10-100° C. for 100-260 seconds after being vulcanized.

7.5 the Bead Setting Device D of the Turn-Up Device

The bead setting device D is mounted on the inner side of the other end of the auxiliary push sleeve 23; the bead setting device D comprises a bead setting driving device 6 and a clamping jaw 7; the clamping jaw 7 is driven by the bead setting driving device 6; and a bead setting portion is arranged at an end of the clamping jaw 7, and the bead setting portion is a circular arc surface or an inclined plane.

The bead setting portion is designed to be a circular arc surface or an inclined plane mainly for matching with the shape of the cross section of the bead ring at the end of the apex, therefore, in the bead setting process, the bead setting portion closely fits with the apex bead ring, so that the bead ring is not prone to loosening, is firmly and accurately combined with the bead body after the bead setting process, and generates no axial or radial offset after the bead setting device is removed, which improves the building quality of the tire.

7.6 the Bead Locking Device E of the Turn-Up Device

The bead locking device E comprises: a locking block 9, a sliding disk 11, a mandril 10, a cylinder body 27 (cylinder), a piston 28 and a supporting member 34; the sliding disk 11 is located at the outside of the sealing outer sleeve 16; the sliding disk 11 has an inclined plane, and the bottom of the mandril 10 abuts against the inclined plane of the sliding disk 11 through a rolling mechanism 35; the upper part of the mandril 10 is supported by the supporting member 34, and the supporting member 34 is fixedly connected to the cylinder body 27; the locking block 9 is arranged at the top of the mandril 10; the sliding disk 11 is connected with the end of the piston 28; and the piston 28 is mounted on the outer side of the sealing outer sleeve 16, and the cylinder body 27 is mounted on the outer side of the piston 28.

The cylinder 27 is inflated to push the piston 28 to move toward the tire and then pushes the sliding disk 11 to move toward the tire. Then, the mandril 10 on the sliding disk 11 rises along the inclined plane, driving the locking block 9 and the bladder 8 to rise to lock the bead.

7.7 Other Devices of the Turn-Up Device

The tire building machine further comprises: a connecting rod 21 and a flange plate 20; one end of the connecting rod 21 is mounted on the flange plate 20, and the other end successively penetrates through the finger paddle mounting seat 25, the finger paddle push disk 24 and the supporting portion 31; and the flange plate 20 is connected with the sealing inner sleeve 15.

7.8 the Building Machine Main Shaft 13 of the Turn-Up Device The manufacturing method of the building machine main shaft 13 may be as follows:

step 1: selecting the raw materials of the workpiece;

step 2: heating for the first time: placing the workpiece in a furnace for heating, keeping the temperature in the furnace at 1000-1200° C., and preserving the temperature for 3 hours;

step 3: building for the first time: taking out the workpiece from the furnace, and upsetting the workpiece to a first size by using upper and lower flat anvils via a wide anvil compaction forging method;

step 4: heating for the second time: placing the workpiece in the furnace for heating to conduct secondary recrystallization, normalizing and tempering, and then performing heating and cooling treatment for three times;

step 5: building for the second time: taking out the workpiece from the furnace, and upsetting the workpiece to a second size by using the upper and lower flat anvils via the wide anvil compaction forging method;

step 6: cutting, grinding and flaw detection: performing flaw detection and grinding on the workpiece with the second size, ensuring that the roughness of the ground place is higher than 12, and then performing flaw detection for the first time;

step 7: rough turning: performing rough turning, so that the roughness of the outer surface of the workpiece is higher than 15, and then performing flaw detection for the second time; and step 8: finish turning: performing finish turning to obtain a main shaft as a finished product.

The secondary recrystallization normalizing and tempering specifically comprises: placing the workpiece in the furnace, ensuring that the temperature in the furnace is 400-420° C. when the workpiece is placed in the furnace, heating up to about 900-950° C., preserving the temperature for about 10 hours, wherein the temperature increment per hour is less than or equal to about 850° C. in the heating up process, then cooling by air for about 3 hours to reduce the furnace temperature to about 300-350° C., and preserving the temperature for about 10 hours;

then, heating up to about 800-900° C., performing the heat preservation for about 10 hours, wherein the temperature increment per hour is less than or equal to about 50° C. in the heating up process, then performing air cooling for about 3 hours to reduce the furnace temperature to about 300-350° C., and performing the heat preservation for about 10 hours; and thereafter, when the temperature in the furnace drops below about 150° C., taking out the workpiece from the furnace.

The chemical element contents of the building machine main shaft 13 are as follows: C: 0.3-0.45%, Si: 0.27-0.35%, Mn: 0.80-1.50%, P: 0.01-0.020%, S: 0.002-0.020%, Cr: ≤1.20%, Ni: 0.15-0.30%, Mo: 0.23-0.25%, Cu: ≤0.15%, Al: 0.025-0.035%, and the balance is Fe.

Due to the above component selection and the building process of the building main shaft, the strength and the wear resistance of the building main shaft are improved, and the service life of the equipment is prolonged.

IV. Transfer Process of the First Carcass Transfer Device

In the building process of an all-steel radial tire, the carcass is generally directly transferred by a group of transfer rings, and due to the existence of the turn-up device, the carcass cannot be directly clamped from the carcass drum and transferred to the building drum. The present disclosure cleverly solves this problem.

The exemplary steps of conveying the first carcass assembly from the carcass drum to the building drum by using the first carcass transfer device may be as follows:

Step 1, preparation: the entire first carcass transfer device is at a waiting position, and the turn-up device K faces to the carcass drum; the oil cylinder 73 on the supporting device H retracts back to take back the roller 71 and to cause the roller to leave the balance seat M; and then, the rotating device J rotates 180 degrees, so that the transfer ring device G faces to the carcass drum.

Step 2, clamping: the oil cylinder 73 on the supporting device H extends out, so that the roller 71 is supported on the balance seat M, and the first carcass transfer device moves toward the carcass drum; when the first carcass assembly is located in the transfer ring device G, the first carcass transfer device stops moving; and then, the transfer ring device G clamps the first carcass assembly located on the carcass drum.

Step 3: transfer: the first carcass transfer device moves toward the building drum, and after the transfer ring device G leaves the carcass drum, the oil cylinder 73 on the supporting device H retracts back to take back the roller 71 and to cause the roller to leave the balance seat M; and then, the rotating device J rotates 180 degrees, so that the turn-up device K faces to the carcass drum; and the oil cylinder 73 on the supporting device H extends out, so that the roller 71 is supported on the balance seat M, and the first carcass transfer device moves toward the building drum.

Step 4, release: after the transfer ring device G sleeves the first carcass assembly on the building drum, the first carcass transfer device stops moving; and then, the transfer ring device G releases the green tire and sleeves the first carcass assembly on the building drum.

Step 5, wait: the first carcass transfer device moves toward the carcass drum and moves to the waiting position V. Turn-Down and Turn-Up Building Processes 1. The turn-down and/or turn-up process is performed on the carcass by using the mentioned turn-up building device, and comprises the following steps:

step 1: sleeving the carcass assembly on the carcass drum;

step 2: respectively performing turn-down on the two sides of the carcass assembly by using a first turn-up device and a second turn-up device;

step 3: respectively performing bead setting on the two sides of the carcass assembly by using the first turn-up device and the second turn-up device;

step 4: respectively performing bead locking on the two sides of the carcass assembly by using the first turn-up device and the second turn-up device;

step 5: respectively performing turn-up on the two sides of the carcass assembly by using the first turn-up device and the second turn-up device; and step 6: completing all turn-up processes of the carcass assembly to obtain the first carcass assembly.

2. The turn-down procedure in step 2 comprises a step 2.1:

the turn-up device moves integrally along the axial direction of the building machine main shaft 13 toward the carcass drum, and the outer sleeve device A stops moving when the turn-up device arrives at a first distance away from the carcass drum; however, the ply down finger assy B and the device thereon, and the bladder device C and the device thereon continue to move along the axial direction of the building machine main shaft 13 toward the carcass drum; at this time, the finger paddle 4 on the ply down finger assy B rotates along a hinge shaft, and the top thereof scatters; and the edge portion of the carcass assembly to be subjected to the turn-up procedure is just located on the inner side of the finger paddle 4.

3. The turn-down procedure in step 2 comprises a step 2.2, which is executed after the step 2.1:

the outer sleeve device A moves toward the carcass drum, and the auxiliary push sleeve 23 on the outer sleeve device A comes into contact with the finger paddle 4, so that the finger paddle rotates around the hinge shaft and tucks; and in the tucking process, the finger paddle abuts the edge portion of the carcass assembly against the bladder 8.

At this time, the finger paddle 4 tucks to clamp the edge portion of the carcass assembly between the finger paddle 4 and the bladder 8, and the edge portion of the carcass assembly is continuously pressed toward the axle center of the building machine main shaft 13 with the folding of the finger paddle 4.

4. The bead setting step in step 3 comprises:

an apex bead ring is arranged at an end of the clamping jaw 7 of the bead setting device 6; the bead setting driving device 6 pushes the clamping jaw 7, and the clamping jaw 7 pushes the apex bead ring to the set position of the carcass assembly; and then, the clamping jaw 7 returns to the original position under the drive of the bead setting driving device 6, thus completing the bead setting operation; and after the above step, the outer sleeve device A and the ply down finger assy B simultaneously move toward a direction away from the carcass drum for a distance.

5. The bead locking step in step 4 comprises:

the piston 28 moves toward the carcass drum, then pushes the sliding disk 11 toward the carcass drum 2 along the axial direction, so that the mandril 10 rises, and the locking block 9 at the top of the mandril 10 closely abuts the bladder 8 against the carcass assembly.

6. The turn-up step in step 5 comprises:

the bladder 8 is inflated to expand and pushes the carcass assembly upward and toward the carcass drum, and at the same time, the auxiliary push disk 5 pushes the expanded bladder 8 to the carcass drum so as to turn up the carcass assembly to the outer side of the apex bead ring, thus completing the turn-up process.

The first turn-up device is the turn-up device K on the first carcass transfer device located on one side of the carcass drum, and the second turn-up device is a turn-up device K' on the other side of the carcass drum, and the turn-up device K' has the same structure and working mode as the turn-up device K.

Figure 8:
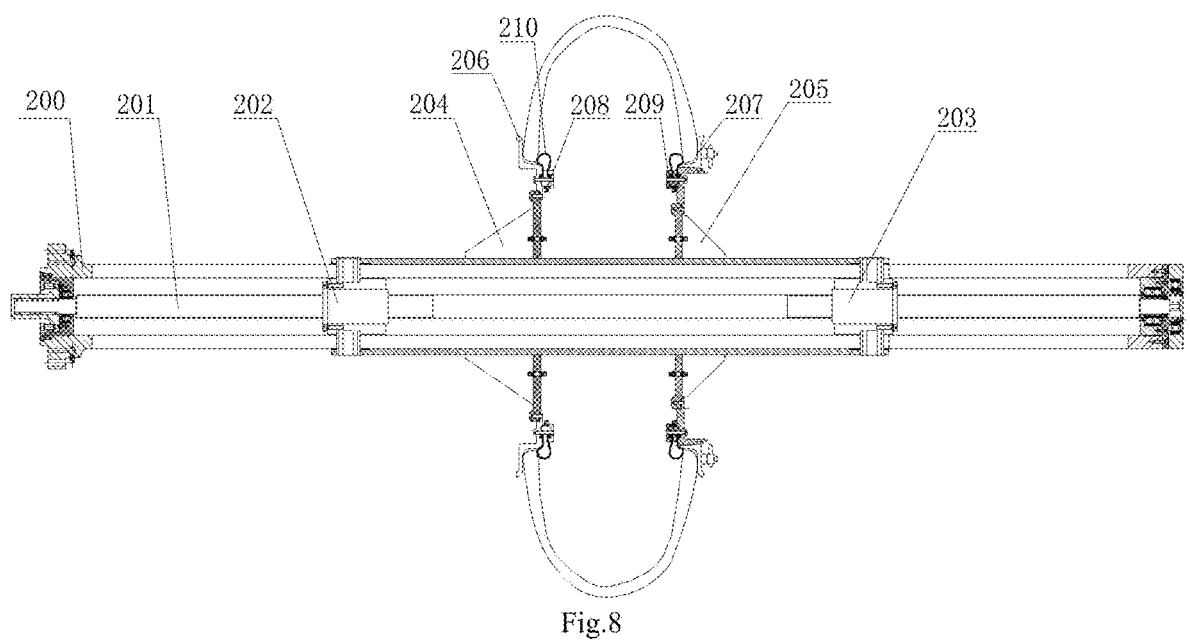
FIG. 8 is a structural schematic diagram of a building drum in the present disclosure.
Figure 9:
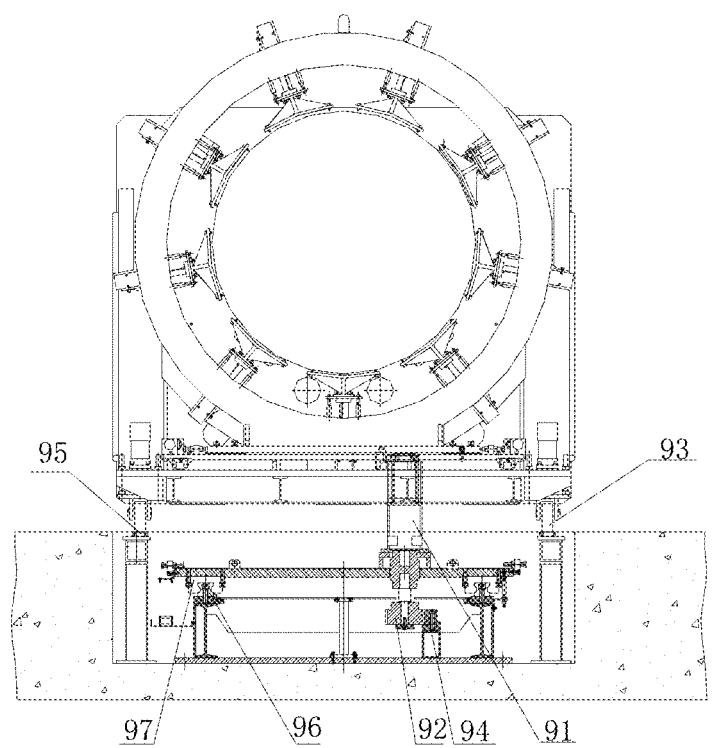
FIG. 9 is a side view of the first carcass transfer device in the present disclosure.

VI. Building Drum Device—FIG. 8

The building drum device comprises a main shaft 200, a lead screw 201, a first nut 202, a second nut 203, a first chuck seat 204, a second chuck seat 205, a first chuck 206, a second chuck 207, a first gland 208 and a second gland 209; the first nut 202 and the second nut 203 are both sleeved on the lead screw 201; the first chuck seat 204 is mounted on the first nut 202; the second chuck seat 205 is mounted on the second nut 203; the first chuck 206 is mounted on the first chuck seat 204; the second chuck 207 is mounted on the second chuck seat 205; one end of a building bladder 210 is sandwiched between the first gland 208 and the first chuck 206; and the other end of the building bladder is sandwiched between the second gland 209 and the second chuck 207.

The above technical solutions are only one embodiment of the present disclosure, those skilled in the art can easily make various types of improvements or modifications based on the principles of the present disclosure, instead of being limited to the descriptions of the above specific embodiments of the present disclosure, therefore, the foregoing descriptions are only preferred, but have no restrictive significance.

Further, the above described embodiment is an exemplary embodiment of the present disclosure, but the embodiment of the present disclosure is not limited to the above described embodiment. Any other changes, modifications, substitutions, combinations, and simplifications made without departing from the spirit and scope of the disclosure should be equivalent replacements and be included in the scope of the present disclosure.

What is claimed is:

1. A tire building method, comprising the following steps:
   step 1, manufacturing a first carcass assembly on a carcass drum, and transferring the first carcass assembly to a building drum through a first carcass transfer device;
   step 2, manufacturing a second carcass assembly on a belt drum, and transferring the second carcass assembly to the building drum through a second carcass transfer device;
   step 3, on the building drum, respectively driving a first chuck seat and a second chuck seat to move oppositely by a first nut and a second nut, with both the first nut and the second nut sleeved on a lead screw, until arriving at a set position to form a building bladder, and inflating the building bladder to support the first carcass assembly;
   step 4, sleeving the second carcass assembly on the supported first carcass assembly, and fitting the two carcass assemblies together and rolling the same to form a third carcass assembly;
   step 5, processing the third carcass assembly to form a fourth carcass assembly; and
   step 6, dismounting the fourth carcass assembly from the building drum, thus completing the tire building operation, wherein, the specific steps of transferring the first carcass assembly to the building drum through the first carcass transfer device are as follows:

step 2-1, preparing: the first carcass transfer device is entirely at a waiting position, and a turn-up device faces a carcass drum; an oil cylinder on a supporting device retracts back to take back a roller and to cause the roller to leave a balance seat; and then, a rotating device rotates, so that a transfer ring device faces the carcass drum;

step 2-2, clamping: the oil cylinder on the supporting device extends out, so that the roller is supported on the balance seat, and the first carcass transfer device moves toward the carcass drum; when the first carcass assembly is located in a transfer ring device, the first carcass transfer device stops moving; and then, the transfer ring device clamps the first carcass assembly located on the carcass drum;

step 2-3, transferring: the first carcass transfer device moves toward the building drum, and after the transfer ring device leaves the carcass drum, the oil cylinder on the supporting device retracts back to take back the roller and to cause the roller to leave the balance seat; and then, the rotating device rotates 180 degrees, so that the turn-up device faces the carcass drum; and the oil cylinder on the supporting device extends out, so that the roller is supported on the balance seat, and the first carcass transfer device moves toward the building drum;

step 2-4, releasing: after the transfer ring device sleeves the first carcass assembly on the building drum, the first carcass transfer device stops moving; and then, the transfer ring device releases a green tire and sleeves the first carcass assembly on the building drum; and step 2-5, waiting: the first carcass transfer device moves toward the carcass drum and moves to the waiting position.

2. The tire building method according to claim 1, wherein: the method of manufacturing the first carcass assembly on the carcass drum comprises the following steps:

step 1-1: sleeving at least one carcass assembly on the carcass drum;

step 1-2: performing turn-down on two sides of the carcass assembly by using a first turn-up device and a second turn-up device;

step 1-3: performing bead setting on the two sides of the carcass assembly by using the first turn-up device and the second turn-up device;

step 1-4: performing bead locking on the two sides of the carcass assembly by using the first turn-up device and the second turn-up device;

step 1-5: performing turn-up on the two sides of the carcass assembly by using the first turn-up device and the second turn-up device; and step 1-6: completing all turn-up processes of the carcass assembly to obtain the first carcass assembly.

3. The tire building method according to claim 2, wherein: the turn-down procedure in step 1-2 comprises a step 2.1: each of the first turn-up device and the second turn-up device moves integrally along the axial direction of a building machine main shaft toward the carcass drum, and an outer sleeve device stops moving when each of the turn-up devices arrives at a first distance away from the carcass drum; a ply down finger assembly and a device thereon, and the building bladder and a device thereon continue to move along the axial direction of the building machine main shaft toward the carcass drum; a finger paddle on the ply down finger assembly rotates along a hinge shaft, and a top thereof scatters; and an edge portion of the carcass assembly to be subjected to the turn-up procedure is located on an inner side of the finger paddle.

4. The tire building method according to claim 3, wherein: the turn-down procedure in step 1-2 comprises a step 2.2, which is executed after the step 2.1:
the outer sleeve device moves toward the carcass drum, and an auxiliary push sleeve on the outer sleeve device comes into contact with the finger paddle; so that the finger paddle rotates around the hinge shaft and tucks; and in a tucking process, the finger paddle abuts the edge portion of the carcass assembly against the building bladder.

5. The tire building method according to claim 2, wherein: the bead setting step in step 1-3 comprises:
an apex bead ring is arranged at an end of a clamping jaw of a bead setting device; a bead setting driving device pushes the clamping jaw, and the clamping jaw pushes the apex bead ring to the set position of the carcass assembly; and then, the clamping jaw returns to the original position under the drive of the bead setting driving device, thus completing the bead setting operation; and after the above step, the outer sleeve device and a ply down finger assembly simultaneously move toward a direction away from the carcass drum for a distance.

6. The tire building method according to claim 2, wherein: the bead locking step in step 1-4 comprises: a piston moves toward the carcass drum, then pushes a sliding disk toward the carcass drum along the axial direction, so that a mandril rises, and a locking block at a top of the mandril closely abuts a turn-up bladder against the carcass assembly.

7. The tire building method according to claim 2, wherein: the turn-up step 1-5 comprises: a turn-up bladder is inflated to expand and pushes the carcass assembly upward toward the carcass drum, and at the same time, an auxiliary push disk pushes with the expanded turn-up bladder to the carcass drum so as to turn up the carcass assembly to an outer side of an apex bead ring, thus completing the turn-up process.

* * * * *